United States Patent

Koehler

[15] 3,684,879

[45] Aug. 15, 1972

[54] DIVISION UTILIZING MULTIPLES OF THE DIVISOR STORED IN AN ADDRESSABLE MEMORY

[72] Inventor: Howard A. Koehler, Minneapolis, Minn.

[73] Assignee: Sperry Rand Corporation, New York, N.Y.

[22] Filed: Sept. 9, 1970

[21] Appl. No.: 70,777

[52] U.S. Cl. ....................................235/156, 235/164

[51] Int. Cl. ....................................................G06f 7/52

[58] Field of Search...............................235/156, 164

[56] References Cited

UNITED STATES PATENTS 3,223,831 12/1965 Holleran....................235/164

3,234,366 2/1966 Davis et al. .................235/156

3,293,418 12/1966 Thornton...................235/156

*Primary Examiner*—Eugene G. Botz

*Assistant Examiner*—David H. Malzahn

*Attorney*—Thomas J. Nikolai, Kenneth T. Grace and John P. Dority

[57] ABSTRACT

A method and apparatus for the arithmetic division operation is disclosed in which a set of integral multiples of the divisor are stored in addresses corresponding to their respective multiplier. Comparison of the highest order multiple less than a predetermined sub-set of the dividend gives first quotient digits corresponding to the address of the multiple. Subtraction of the multiple from the first sub-set and the joining thereto of additional dividend digits gives further sub-sets for which the process can be continued.

17 Claims, 5 Drawing Figures

INVENTOR
HOWARD A. KOEHLER

BY Thomas J. Nikolai
ATTORNEY

DIVISION UTILIZING MULTIPLES OF THE DIVISOR STORED IN AN ADDRESSABLE MEMORY

BACKGROUND OF THE INVENTION

In the arithmetic operations associated with digital computing machinery there exist several processes for dividing one number by another. For example, there is the so-called iterative scheme wherein, if A/B is to be determined, 1/B can first be determined through application of an iteration formula and then multiplied by A. Such processes generally involve the operations of addition, subtraction and multiplication and may involve considerable programming.

Another commonly applicable method of performing a division is the so-called restoring method in which the divisor is successively subtracted until the remainder goes negative. Thereafter the divisor is added in once to give a positive remainder. The quotient digit then is one less than the number of subtractions which were performed. The remainder is shifted left one position and the process repeated to obtain subsequent quotient digits. Also well-known are nonrestoring methods of division. In this case, the divisor is not added back when the remainder goes negative. Rather the remainder is shifted left one place and the divisor added in until the remainder becomes positive. The remainder is then again shifted left one place and subtraction again takes place. The number of subtractions or additions at each shift is recorded and these are given a positive sign in the case of subtractions and a negative sign in the case of additions. The quotient may then be obtained from these digits by a process of adding and subtracting them, starting at the least significant end. Non-restoring methods of division are described in a paper titled "High Speed Arithmetic in Binary Computers" appearing in Proc. I.R.E. No. 49 (1961).

In binary arrangements the process is often simplified through the fact that only the digits 1 and 0 are involved whereby, instead of multiplications and subtractions, only a relatively simple comparison operation may be required. However, where only one quotient digit at a time is generated, the process may proceed very slowly. At the same time, where restoring methods are utilized, these will result in further slowing of the process. It is to the overcoming of such prior art difficulties that the present invention is directed.

SUMMARY OF THE INVENTION

In the illustrated embodiment this invention makes use of the relatively simple relationship existing between the binary notation and octal notation to generate a plurality of quotient digits at each cycle. At the same time, the process is further accelerated by avoiding the necessity for a restoring cycle and the relatively complex arrangements which might be required in a non-restoring cycle.

Thus, the invention provides means for addressably storing a plurality of integral multiples of a divisor, means for comparing said multiples with sub-sets of the dividend, means for reading out and storing as quotient digits the address of the largest said multiple less than the sub-set under consideration, means for subtracting said multiple from the sub-set and means for appending to the remainder further dividend digits, thereby to form additional sub-sets, the entire process being continued until the dividend has been exhausted and/or a predetermined plurality of quotient digits accumulated.

Although the scheme at hand has been specifically illustrated in respect of the relationship between binary and octal notation, it can be equally applied to other notations in principle where the economics might justify it. In the octal relationship, quotient digits are accumulated three at a time and seven storage registers must be provided for the divisor multiples. By using a base of 16, four quotient digits can be accumulated at each cycle and 15 registers would be required. It would seem possible to employ the method in decimal computation where, however, in order to accumulate three quotient digits at a time, 999 registers would be necessary and the economics would seem to rule against the likelihood under the present state of the art.

DESCRIPTION OF THE PREFERRED EMBODIMENT

Figure 1:
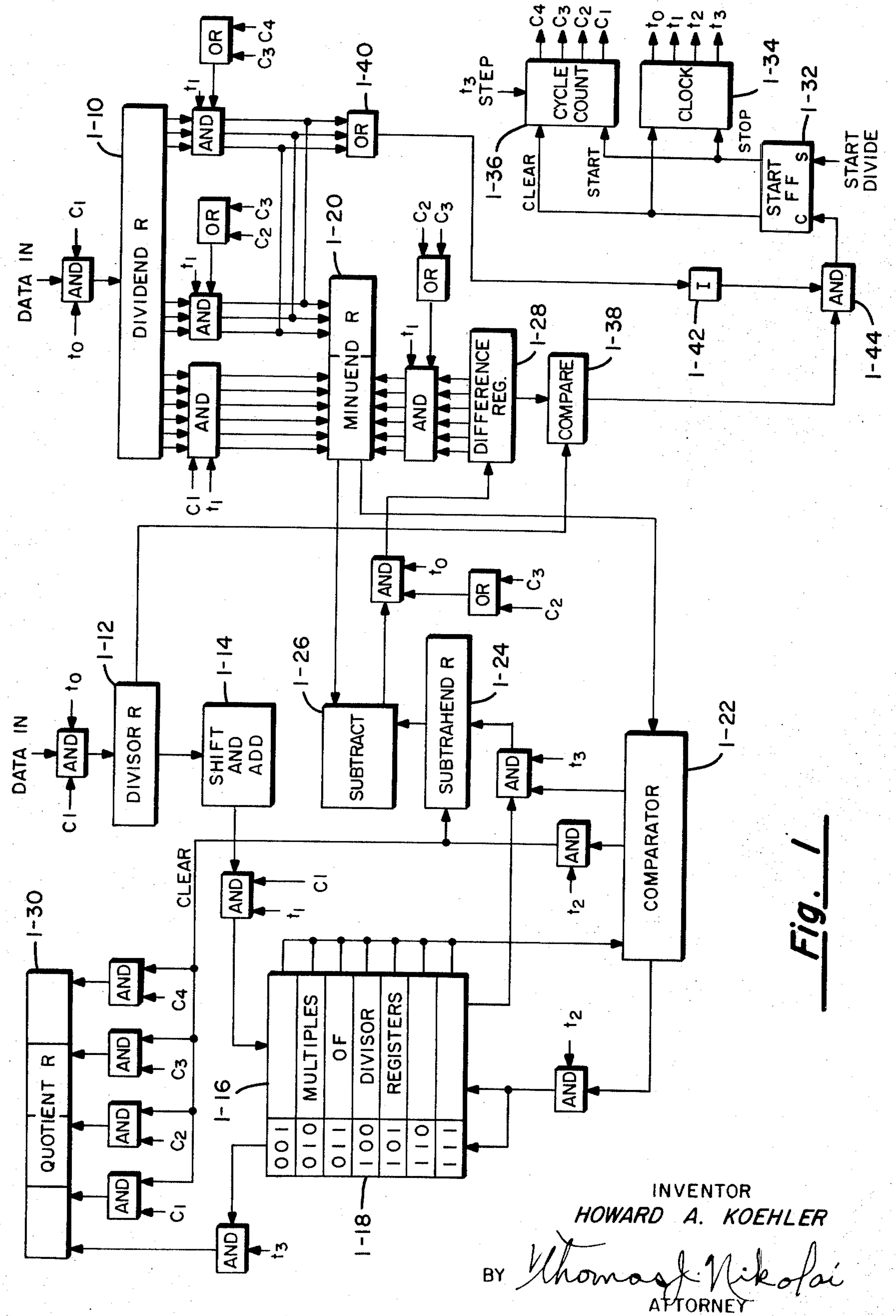
FIG. 1 is a block diagram of the basic logic which may be utilized to perform the invention.

Consider first of all the pencil and paper method of performing a division. As an example, the number $5257_8$ will be divided by $74_8$. The procedure is well-known, aside from the fact that it must be borne in mind that working is in the octal scale.

| | | |
|---|---|---|
| | 55 | quotient |
| Divisor | $74_8)5257_8$ | dividend |
| | 454 | |
| | 517 | |
| | 454 | |
| | 438 | remainder |

In the scale of the present invention it would appear as follows:

First Example

| Table Address | Multiple | | |
|---|---|---|---|
| | | 101101 | quotient |
| 000 | 000000000 | Divisor 111100)101010101111 | dividend |
| 001 | 000111100 | 100101100 | |
| 010 | 001111000 | 101001111 | |
| 011 | 010110100 | 100101100 | |
| 100 | 011110000 | 100011 | remainder |
| 101 | 100101100 | | |
| 110 | 101101000 | | |
| 111 | 110100100 | | |
| **010000** | | | |

The steps are as follows:

SECOND EXAMPLE

| Table Address | Table Multiple | | | | |
|---|---|---|---|---|---|
| 000 | 000000000 | | 001000100011 | Quotient | $1043_8$ |
| 001 | 000000101 | Divisor | 000101)101010101111 | Dividend | $5_8)5257_8$ |
| 010 | 000001010 | | 101 | | 5 |
| 011 | 000001111 | | 000010 | | 02 |
| 100 | 000010100 | | 000000 | | 00 |
| 101 | 000011001 | | 010101 | | 25 |
| 110 | 000011110 | | 010100 | | 24 |
| 111 | 000100011 | | 001111 | | 17 |
| | | | 001111 | | 17 |
| | | | 000 | | 0 |

1. A table of multiples of the divisor is prepared in which address 000 contains all 0's, address 001 contains the divisor, address 010 contains twice the divisor and so on to address 111 which contains seven times the divisor.

2. Inspection of the table shows that address 111 requires nine bit positions. Accordingly, the nine most significant bits of the dividend are compared with consecutive words in the table starting with address 111. The search is made for the first word in the table which is equal to or smaller than the nine most significant bits in the table. It is found that the word in address 101 satisfies this requirement. Accordingly, this word is subtracted from the dividend and the address thereof, namely 101, becomes part of the quotient.

3. The difference resulting from the subtraction has appended to it the remaining three bits from the dividend and a further comparison with the table is carried out, exactly as before. Again it is found that the contents of address 101 meet the requirements so that 101 is again placed in the quotient and the contents of address 101 are subtracted. Since no more digits remain in the dividend, the result then is as shown and the result of the last subtraction is the remainder.

In the second example shown, although the dividend remains the same, the divisor in this instance provides only three significant bits. The table which is set up as before will thus have no more than six significant bits in address 111. Evidently, in such a case, if comparisons were made on the same basis as in the first example, the quotient generated would be incorrect and it accordingly becomes necessary to carry out a normalization. In this instance it will be clear that either one could provide an additional table entry, i.e., an address 1000, containing 000101000, or have as initial comparison only the first three bits of the dividend. In the version of the invention specifically described hereinafter, the second possibility has been adopted and the normalization procedure will be described in connection with FIG. 3.

Refer now to FIG. 1. Dividend register 1–10 and divisor register 1–12 are loaded from external sources. This can be done prior to the start of the problem or, as depicted, following setting of a start flip-flip 1–32 from a divide instruction derived from a machine in which the invention is incorporated. As shown and described hereinafter, dividend register has a capacity of 12 bits and divisor register has a capacity of six bits. However, it is to be emphasized that these figures have been chosen arbitrarily and might be varied to suit individual requirements. Since, however, for the sake of the examples under consideration, we are dealing with the well known relationship between octal and binary notation, the number of bits chosen should be integrally divisible by three.

The dividend register is used to load the minuend register 1–20 in a manner which will be more completely explained in connection with FIG. 3. It is sufficient for the moment to note that the minuend register which is of nine bit length may have either its six least significant bits or its three least significant bits loaded from the dividend register.

From the divisor register 1–12 the multiples-of-divisor register 1–16 are loaded via shift and add circuits 1–14. The manner of loading will be more completely described in connection with FIG. 2.

The contents of minuend register 1–20 are compared simultaneously with the contents of all the multiples of divisor register 1–16 by means of comparator 1–22. The comparator and its manner of operation are more completely described in conjunction with FIGS. 4 and 5. It is sufficient to note for the moment that the output of comparator 1–22 will be in the form of a gating signal which is capable of gating the contents of a selected one of the registers 1–16 to the subtrahend register 1–24 and the address portion 1–18 of such selected register to the quotient register 1–30.

Each of the multiples-of-divisor registers will have a nine bit capacity and the respective address portions 1–18 will have a three bit capacity. The quotient register 1–30 has a 12-bit capacity and the subtrahend register 1–24 has a nine-bit capacity.

The contents of the subtrahend and minuend registers are passed to subtract circuits 1–26 and the difference from the subtract circuit 1–26 is stored in a difference register 1–28. This difference register is of six-bit length in the illustrated embodiment.

Following the first loading cycle of the minuend register from the dividend register, on subsequent cycles the minuend register will have its six most significant bits loaded from the difference register and its three least significant bits loaded from the dividend register.

Timing and control circuits may take the form of a clock 1–34 which may generate timing pulses *t*0, *t*1, *t*2 and *t*3 and a cycle counter 1–36 which generates count signals for each dividend cycle. As shown, four counts are generated but again this is arbitrary and directed to the illustrated embodiment. For longer dividends, a greater number of counts would have to be provided. The counter 1–36 may be started from the start flip-flip 1–32 and stepped on each *t*3 clock signal.

At the end of the problem the circuit may be turned off by detecting a condition in which there are no more significant digits in the dividend register and the contents of the difference register are less than the contents of the divisor register. Such detection is carried out by means of gates, inverters and comparator 1–38 as shown and the output of gate 1–44 used to clear the start flip-flip 1–32. Although not specifically shown for the sake of simplicity, the clear signal at the end of the problem may be utilized to clear the registers preparatory to commencing a new problem. Other means might also be used to terminate the operation, such as, for example, determining when a desired number of quotient digits have been accumulated. It is obvious that other variants are possible.

Figure 2:
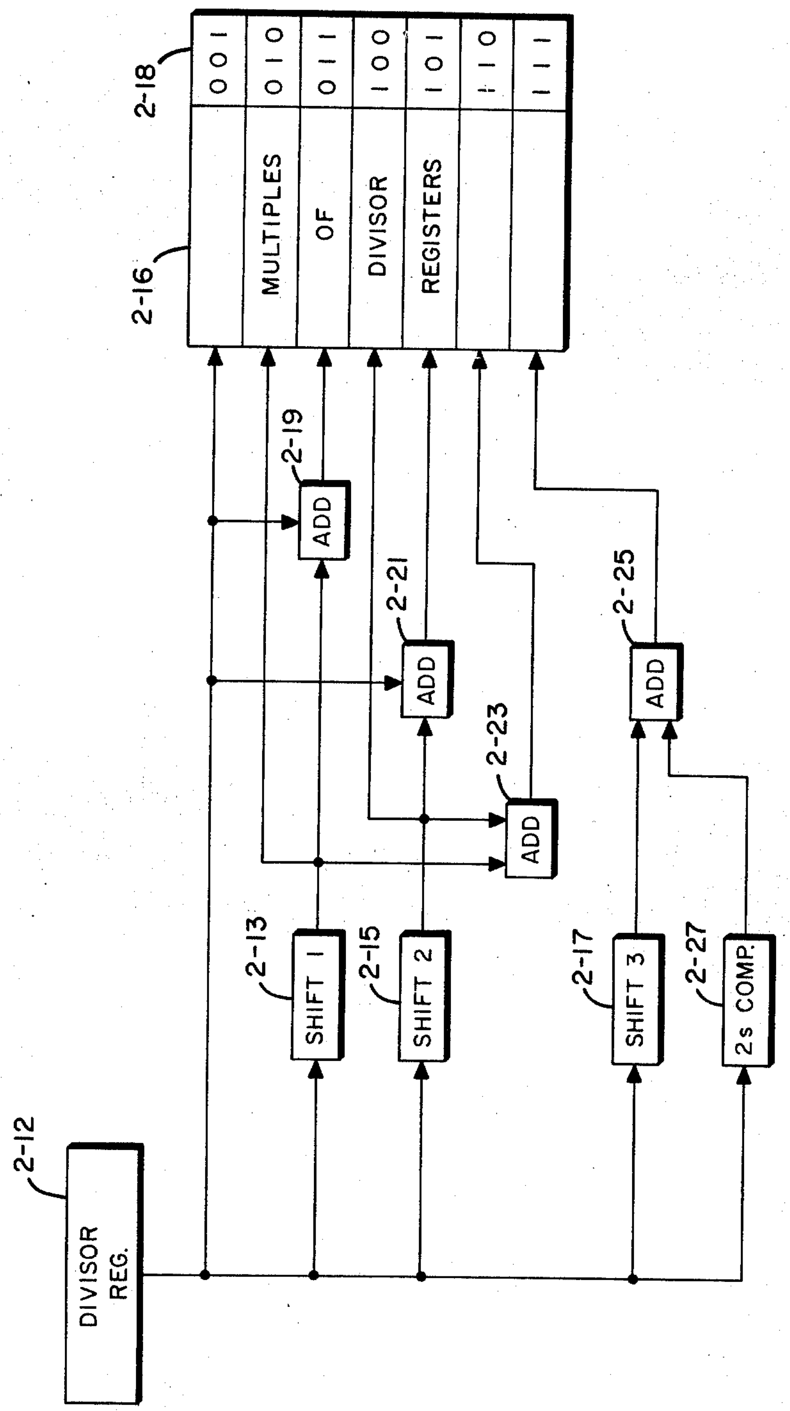
FIG. 2 is a block diagram of logic which can be utilized in loading the addressable registers with multiples of the divisor.

Refer now to FIG. 2 which shows in block form the basic logic which may be utilized in loading the multiples-of-divisor registers from the divisor register. All such multiples-of-divisor registers from the divisor register. All such multiples-of-divisor registers 2–16 are loaded simultaneously. It will be noted that although the tables previously indicated for carrying out the problem by means of pencil and paper included an address 000, such an address and a register corresponding thereto would be unnecessary in a practical embodiment of the invention.

The register bearing the address 001 is loaded by means of a direct transfer of the contents of the divisor register. It will be realized that address 010 may be loaded by doubling the contents of the divisor register and this doubling is in fact accomplished by providing a shifter 2–13 which provides a left shift of one bit position. The output of the shifter 2–13 is passed directly to the register having the address 010 and via adder 2–19 to the register bearing the address 011. The other input to adder 2–19 comes directly from the divisor register 2–12. It will be realized that the output of shifter 2–13, which is double the divisor, plus the contents of divisor register 2–12, will give three times the contents of divisor register 2–12.

The output from divisor register 2–12 is also passed to shifters 2–15 and 2–17 as well as to a 2's complementer 2–27. The output from shifter 2–15 goes directly to the register bearing the address 100 and via adder 2–21 to the register having the address 101.

Shifter 2–15 accomplishes a left shift of two bit positions thereby effectively quadrupling the contents of divisor register 2–12. Adder 2–21 combines the output of shifter 2–15 with the contents of divisor register 2–12 and this gives a multiple of five times the divisor which is placed in the register having the address 101.

The outputs of shifter 2–13 and 2–15 are added in adder 2–23 and the output of adder 2–23 is stored in the register having the address 110. It will be realized that double the contents of divisor register 2–12 added to quadruple the said contents will give as a sum six times the contents of divisor register 2–12.

Finally, the output of shifter 2–17 is added to the 2's complementer 2–27 in adder 2–25 and the sum from adder 2–25 is stored in the register bearing the address 111. Shifter 2–17 performs a left shift of three bit positions effectively multiplying the contents of the divisor register by eight. When the 2's complement of the contents of the divisor register are added to this, effectively this results in subtracting the contents of the divisor register so that as a result the contents of the register having the address 111 will be seven times the divisor register contents.

It will be observed throughout that the address of each of the multiples of divisor register corresponds in binary notation to the multiple of the divisor register stored therein.

Figure 3:
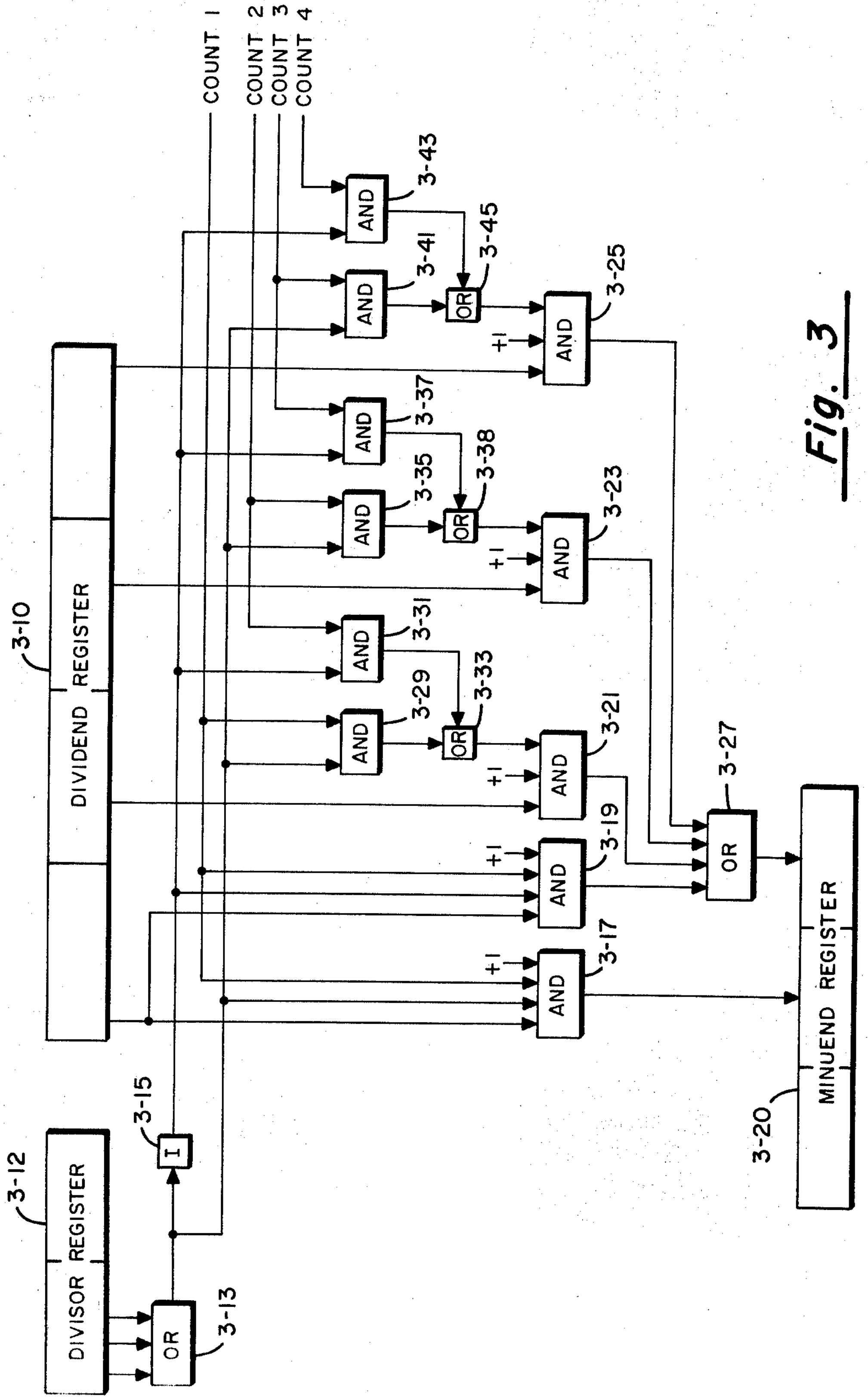
FIG. 3 is a block diagram showing logic used to line up, in effect, the divisor and the dividend.

Consider now FIG. 3 which shows in block form an arrangement by which normalization or 'lining up' of the divisor or dividend may be carried out. It is realized that the problem of lining up is one which will always occur in a machine which must accommodate any given number of significant digits up to its full capacity but which does not particularly concern a human operator utilizing pencil and paper. In the latter instance a simple inspection will be all that is necessary. Also it may be noted that variations in the method and means shown will be obvious to those skilled in the art.

As discussed previously in conjunction with FIG. 1, the minuend register will be loaded from the dividend register on the first machine cycle. Depending upon the number of significant bits in the divisor it is found desirable to place either the six most significant bits from the dividend register into the minuend register or the three most significant bits from the dividend register into the minuend register. In either instance bits thus transferred from the dividend register will occupy the least significant bit positions in the minuend register. The reason for such shifting of bits lies in the comparison which must subsequently take place between the contents of the minuend register and the contents of the multiples-of-divisor register. It will be realized that in the case where there are no more than three significant divisor bits, there will be no more than six significant bits stored in the highest order multiples-of-divisor register. On the other hand, should there be six significant bits in the divisor, then the highest order multiples-of-divisor register will store nine significant bits. The comparator is adapted to perform nine-bit comparisons.

The problem then is to determine in each instance which bits are to be compared. Thus, in the first example, as given hereinabove, it is evident that ideally the first nine most significant bits from the dividend register should be transferred into the minuend register for comparison with the contents of the multiples of divisor registers. On the other hand, if one considers the second example, it is evident that transfers and comparisons on the same basis, i.e., the first nine bits of the dividend, would result in errors. An inspection of the situation as embodied at present will indicate that, on the initial loading of the minuend register, six bits from the dividend register should be transferred thereto in the event that there are at least four significant bits in the divisor register. The three highest order bits of the minuend register on this initial transfer should remain cleared, i.e., storing 0's. However, if there are no more than three significant bits in the divisor register, i.e., the three lower order bits, then on the first cycle of operation only the three most significant dividend bits should be transferred to the minuend register and the transfer should take place to the three least significant bit positions of the minuend register. On subsequent cycles of operation, subsequent groups of three bits will be transferred from the dividend register to the least significant three bit positions of the minuend register. Where there are only three bits transferred during the first cycle, then the six higher order bit positions of the minuend register will remain cleared, i.e., storing 0's.

It will be realized that with the present embodiment, depending upon how many bits are initially transferred from the dividend register, either three or four cycles of operation may be necessary before the problem is finished. The logic shown takes care of this situation.

To the divisor register 3–12 an OR-gate 3–13 is coupled to the three highest order bit positions. The output of this OR gate will be 0 only in the event that all three highest order bits are 0's. This output is connected to AND-gates 3–17, 3–29, 3–35, and 3–41 and additionally it is passed to an inverter 3–15. The inverter accordingly will provide a 1 output only in the event that the three higher order bits are 0's. The output of the inverter is coupled to AND-gates 3–19, 3–31, 3–37, and 3–43.

AND-gates 3–17, 3–19, 3–21, 3–23, and 3–25 are each representative of three AND gates arranged to couple bits from the dividend register to the various bit positions in the minuend register. Thus, AND-gate 3–17 will actually be representative of three AND gates which may couple the three highest order bits from the dividend register into the centrally located corresponding bit positions in the minuend register. AND-gate 3–17 is enabled by the direct output of OR-gate 3–13, a count 1 signal from the cycle counter and a *t1* timing signal.

In the event that the divisor register contains one or more 1's in the highest order three bit positions, then AND-gate 3–29 will also be enabled by the count 1 signal and the output therefrom will pass through OR-gate 3–33 to enable AND-gate 3–21 on the first count. The enabling of AND-gate 3–21, which again is representative of three AND gates, will transfer the next three bits from the dividend register 3–10 through OR-gate 3–27 into the lowest order bit positions of the minuend register 3–20.

Still considering the situation where there is a 1 among the highest order three bits of the divisor register it will be seen that on the second count, i.e., the second dividing cycle, AND-gate 3–35 will be enabled. This passes a signal through OR-gate 3–38 to enable AND-gate 3–23. AND-gate 3–23 is again representative of three AND gates and when enabled will transfer the next three bits from the dividend register 3–10 via OR-gate 3–27 into the lowest order three bit positions of the minuend register 3–20.

On the third count AND-gate 3–41 will be enabled in a similar manner to provide an enabling signal to AND-gates 3–25 via OR-gate 3–45 whereby the final three bits from the dividend register are transferred via OR-gate 3–27 into the lowest order three bit positions of the minuend register.

Consider now the situation where the three highest order bits from the divisor register are all 0's. Under this situation AND-gates 3–17, 3–29, 3–35, and 3–41 are all disabled whereas AND-gates 3–19, 3–31, 3–37, and 3–43 are enabled. It will be seen readily that on count 1 the highest order three bits from the dividend register are transferred via AND-gates 3–19 and OR-gate 3–27 into the lowest order three bits of the minuend register. On count 2 AND-gate 3–31 is enabled, thus enabling AND-gates 3–21 to transfer the next three bits from the dividend register into the lowest order bit positions of the minuend register. Similar transfers take place on counts 3 and 4 via respectively AND-gate 3–37, OR-gate 3–38 AND-gates 3–23; and AND-gate 3–43 OR-gate 3–45 and AND-gate 3–25.

Figure 4:
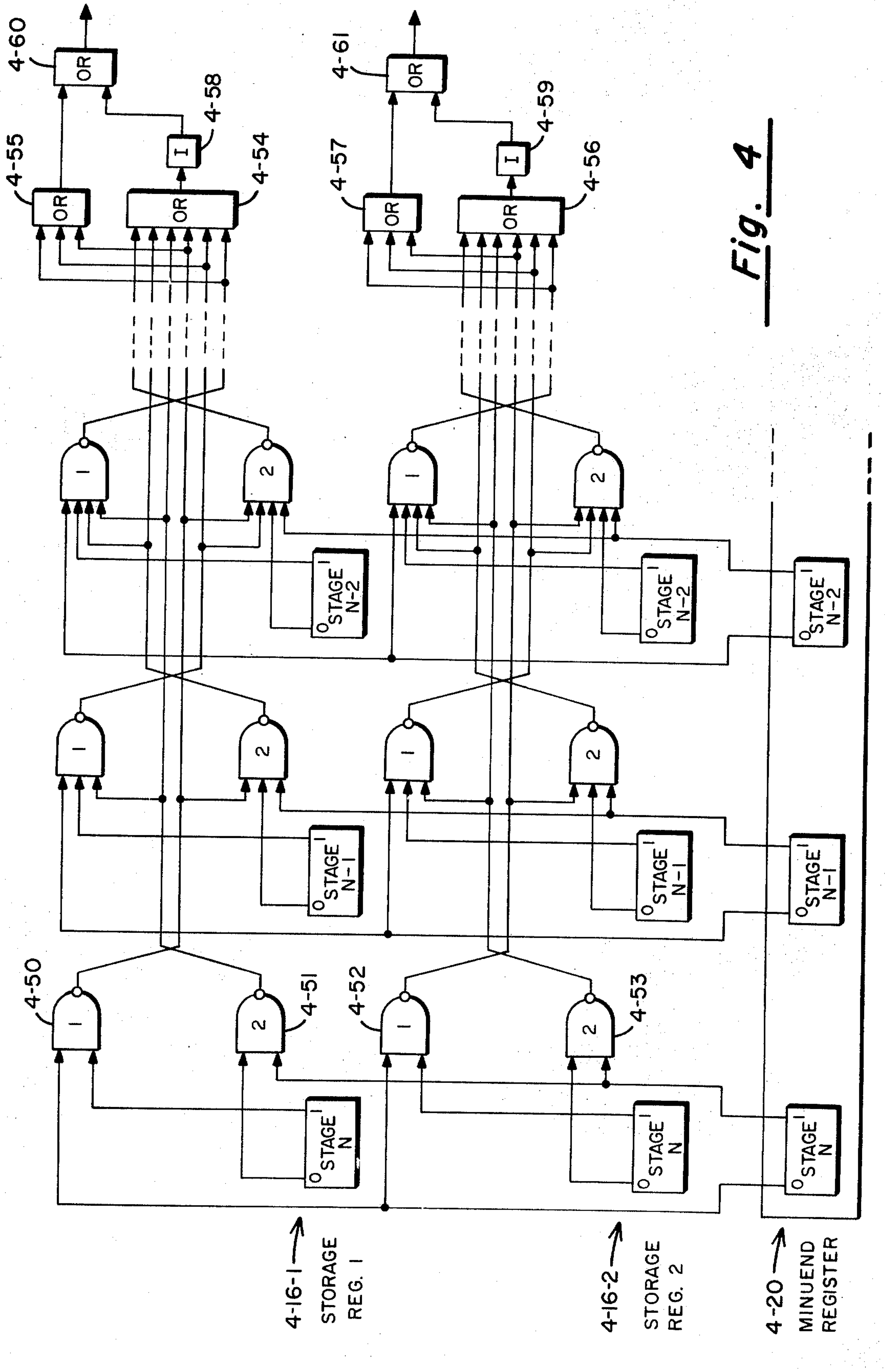
FIG. 4 is a block diagram showing a portion of a comparator suitable for use in the invention.
Figure 5:
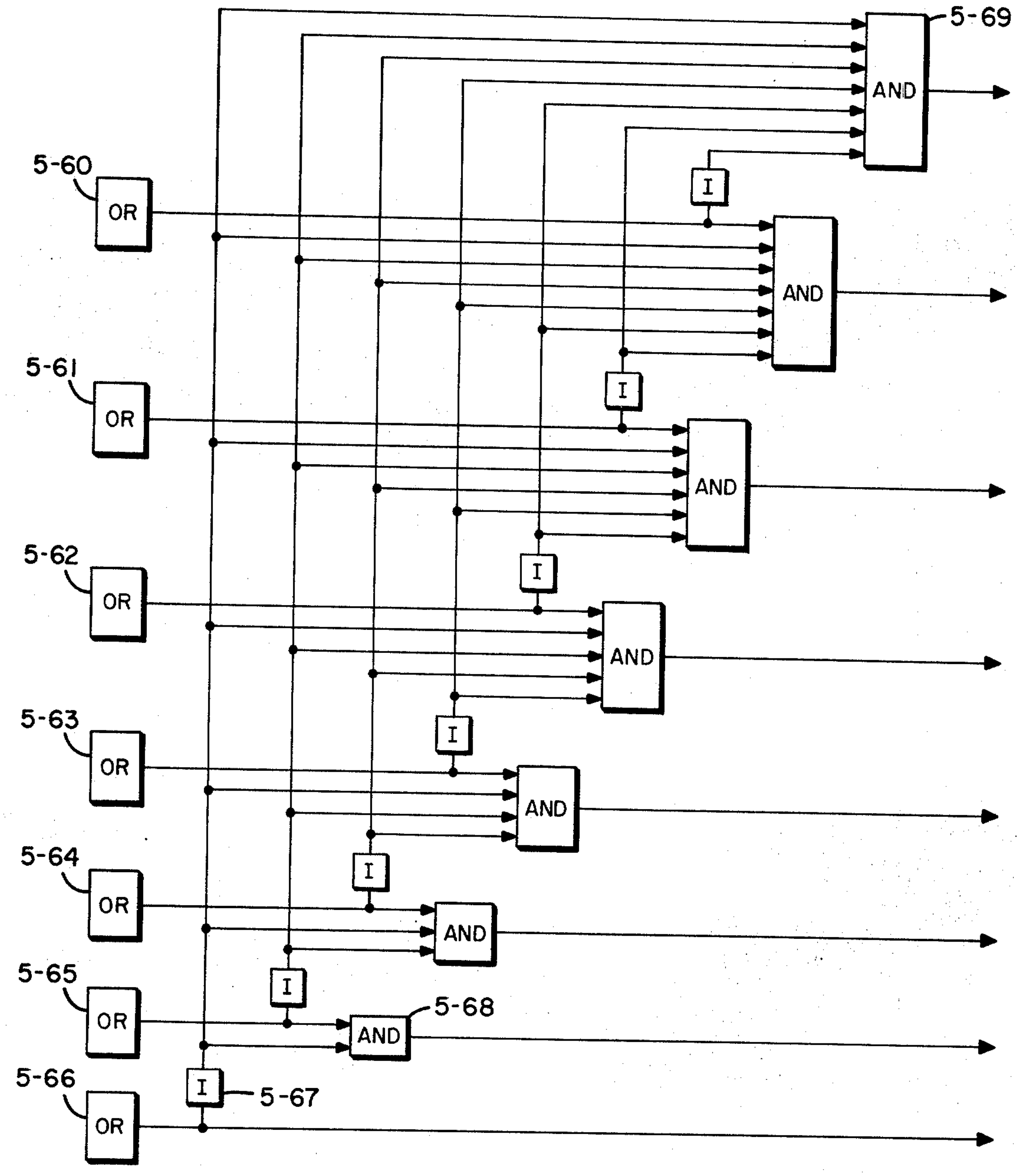
FIG. 5 is a block diagram of logic associated with the comparator output by which only that section of the comparator showing the highest order multiple less than or equal to a given dividend sub-set will produce gating signals to the divisor-multiple-storage register.

Consider next the comparator partially shown in FIG. 4 and the output arrangements thereof shown in FIG. 5. Assume initially that the upper two rows of flip-flops represent the three most significant bits respectively of the divisor-multiples register having addresses 001 and 010. The lowest row of flip-flips may represent the three most significant bits of the minuend register. It will be realized that a row of flip-flops will in each case require nine flip-flops for the embodiment shown and that there will be altogether eight rows of flip-flops in the complete comparator representative respectively of the seven multiples of divisor registers and the minuend register. The comparator design as shown permits simultaneous comparisons between the contents of the minuend register and all of the multiples-of-divisor registers. At the output of the comparator, as shown in FIG. 4, there will be a "1" in the event that the contents of a multiple-of-divisor register is equal to the contents of the minuend register or less than the contents of the minuend register.

The elements of the comparator comprise OR inverters such as inverters 4–50, 4–51, 4–52, and 4–53 of the first column. They will produce a 1 output only in the event that both inputs are 0's.

Consider only a comparison made between the contents of the minuend register and multiple-of-divisor register number 1. Assume that in the highest order stage, both registers are storing a 1. In this instance, inverter 4–50 receives a 0 from stage N of the minuend register and a 1 from stage N of the multiple of divisor register. Its output therefore will be 0.

Inverter 4–51 receives a 1 from the stage N of the minuend register and a 0 from the multiple-of-divisor register number 1. Its output will likewise be 0. Such 0 signals provide enabling inputs to each of the subsequent lower order inverter stages, and at the same time are fed into OR-gate 4–54. It will be evident that if all stages of the minuend register are identical in content with the corresponding stages of the multiple-of-divisor register, then there will be all 0's fed to OR-gate 4–54 and this status may be utilized to provide a 1 output via inverter 4–58 showing that the contents of the two registers are equal.

Assume now that the stage N of the minuend register is storing a 1 and stage N of multiple-of-divisor register 1 is storing a 0. In this case, both inputs to inverter 4–50 will be 0's and both inputs to inverter 4–51 will be 1's. In this case there will be a 1 output from inverter 4–50 and a 0 output from inverter 4–51. The 1 output from inverter 4–50 will provide an effective inhibit signal to all subsequent lower order inverters but will be picked up by OR-gate 4–55 to provide an output signal showing that the contents-of-multiple of divisor register number 1 are less than the contents of the minuend register.

The two inverters at the output of each stage of all the seven multiple of divisor registers perform the same function as described above. The output of both inverters associated with each stage is used to block the opposite inverter for all less significant stages. Since the larger of two numbers is determined by the highest order unlike bits, the disabling of lower order inverters by higher order inverters overrides the effects of lower order unlike bits. With such an arrangement, only one set of inverters per stage can provide a 1 output if the value in the minuend register is not equal to the value in the particular multiple-of-divisor register under consideration.

It will be realized from FIG. 4 and the foregoing description thereof that should, for example, multiple-of-divisor register number 7, i.e., 111, have its contents equal to or less than the contents of the minuend register, then all of the multiple-of-divisor registers would provide 1 outputs from the comparator. In order that only the highest numbered register providing such a comparison may be selected, the arrangement as depicted in FIG. 5 may be utilized. Thus, assume a 1 input to OR-gate 5–66. This will provide a 1 output which may be directly utilized as a gating signal to gate the contents of multiple-of-divisor register 111 to the subtrahend register and the address portion thereof to the quotient register. This 1 output is passed through inverter 5–67 and thereby provides an inhibiting signal on AND gates such as 5–68 associated with multiple-of-divisor registers of lower rank. In the event that the contents of the minuend register are less than the contents of any of the multiple-of-divisor registers, then the output of each of the OR-gates 5–60 to 5–66 will be a 0 and in each case the inverters following such OR gates will provide a 1 output. These 1 outputs provide enabling signals to AND-gate 5–69 and the AND-gate 5–69 may be utilized to provide a clearing signal to the subtrahend register 1–24 (see FIG. 1), as well as to an appropriate section of the quotient register 1–30.

OPERATION

The operation will now be described in conjunction with the two examples as set forth hereinbefore.

Upon receiving the divide instruction, the start flip-flop 1–32, FIG. 1, will be set and will in turn start the clock and as well set the counter to count 1. At time $t\mathbf{0}$ of count b 1, the dividend and divisor registers will be loaded. At time $t\mathbf{1}$, the contents of the divisor register will have passed through the shift and add circuits 1–14 and will be loaded into the multiples-of-divisor registers as described in conjunction with FIG. 2. Also at count 1, time $t\mathbf{1}$, and considering the first of the examples, the six highest order bits of the dividend register will be transferred into minuend register 1–20 with the three highest order bits of the minuend register 1–20 remaining cleared. Thus, the contents of the multiples-of-divisor register will be Table

| Address | Multiple |
|---|---|
| 001 | 000111100 |
| 010 | 001111000 |
| 011 | 010110100 |
| 100 | 011110000 |
| 101 | 100101100 |
| 110 | 101101000 |
| 111 | 110100100 |

The comparison which is immediately carried out between the minuend register and the multiples of the divisor registers will show that there is no multiple of divisor register having contents less than the minuend register. Thus, at time $t\mathbf{2}$, a clear signal will go from the comparator to the subtrahend register. At time $t\mathbf{3}$, the cycle counter will be stepped to count 2 and at time $t\mathbf{0}$, count 2, the difference between the contents of subtrahend register and minuend register will be transferred into difference register 1–28. Since 0's were subtracted in this instance, the contents of the difference register will remain 101010 with only the six lowest order bits being retained. It should be noted that at the same time as clearing of the subtrahend register took place from the comparator, the highest order three bits of the quotient register would likewise be cleared, thereby showing 0's stored at these particular positions.

At time $t\mathbf{1}$ of count 2 the contents of the difference register 1–28 are transferred into the minuend register 1–20 and at the same time the next three bits, i.e., 101, are transferred from the dividend register into the lowest order three-bit positions of the minuend register. Such transfer will take place as explained with reference to FIG. 3.

Again, still on count number 2, the comparison takes place via comparator 1–22. In this case, however, it is found that multiple-of-divisor register having the address 101 is the highest ranking such register having contents less than the contents of the minuend register. The comparator output gate signal, therefore, at time $t\mathbf{3}$, transfers the contents of this register to subtrahend register 1–24 and the address portion 101 to the quotient register 1–30. The subtraction which is carried out places the difference at $t\mathbf{0}$ of count 3 into difference register 1–28, such difference being 101001.

The same cycle is again repeated and again it will be found that the digits 101 are placed in the quotient register and as a result of the subtraction digits 100011 are found in the difference register. Thus, at this point, it will be observed that the contents of the difference register are less than the contents of the divisor register and at the same time there are no further digits remaining in the dividend register. Comparator 1–38 will accordingly provide an output as will inverter 1–42, thereby enabling AND-gate 1–44 to clear the start flip-flop and terminate the operation.

In conjunction with the second example set forth above, it will be apparent, in view of the relative magnitudes of the divisor and dividend, that an additional count is called for. Otherwise the operation proceeds in exactly the same manner with the quotient register accumulating quotient bits three at a time. In the case of the second example, the first comparison will find that minuend register contains 000000101 and there will be an equality comparison with the contents of the first (001) of the multiple-of-divisor registers. It may be noted that in the case of the first example the initial quotient bits were all 0's. Since these of course are not significant, they may be discarded or shifted out of the quotient register.

It is believed that the foregoing description and examples provide clear teaching to the design and construction of high speed division arrangements. As to the elements to be used, i.e., gates, register, adders, subtracters, and the like, these may be for the most part formed by conventional elements well-known to those skilled in the art of date processing. In the case of the comparator, it may be of advantage to employ elements, i.e., the inverters, having high fan-in and fan-out capacity, in order to provide speed advantages. Although specifically illustrated in respect of binary arrangements utilizing the special relationship between binary and octal expressions, it will be evident that the principles shown may be employed in other arrangements particularly where justified by economics and the availability of hardware. Thus, the scope of the invention is intended to be limited only by the claims appended hereto.

I claim:

1. In a computer, a method of dividing numbers expressed in a predetermined base or radix comprising the steps of:

a. storing the dividend as a set of integers in a dividend register, b. addressably storing a plurality of successive multiples of the divisor in a plurality of registers, said plurality equal to the base or radix raised to a predetermined integral power, c. comparing a subset of the integers of the dividend with each multiple of the divisor in a comparator to thereby determine the largest said multiple equal to or less than said subset, d. subtracting the largest said multiple from said subset in a subtractor and adjoining futher dividend integers to the difference thereby to form a further subset of integers, e. storing the address of the largest said multiple to form a quotient, f. repeating steps c to e, but utilizing said further subset of integers as the subset of integers of the dividend until all dividend integers have been utilized.

2. Method as in claim 1 wherein each address corresponds to the multiplier of the divisor multiple stored thereat.

3. Method as in claim 1 wherein the base or radix is two and the predetermined integral power is three.

4. In a computer, a method of performing division on binary numbers comprising the steps of:

a. storing the dividend as a set of binary digits in a dividend register, b. addressably storing a plurality of successive multiples of the divisor in a plurality of registers, said plurality equal to two raised to a predetermined integral power, c. establishing a first subset of the integers of the dividend in accordance with the number of divisor digits, d. comparing said subset of the integers with each multiple of the divisor thereby to determine the largest multiple equal to or less than said subset, e. subtracting said multiple from said first subset in a subtractor and appending to the difference further digits from said dividend thereby to form a further subset, f. storing the address of said multiple in a register to form a partial quotient, g. comparing said further subset with each multiple of the divisor in a comparator to thereby determine the largest multiple equal to or less than said further subset, h. subtracting the multiple determined by step (g) from said further subset in said subtractor and appending to the difference further digits from said dividend, j. storing the address of the multiple determined by step (g) to form further quotient digits, k. continuing the process as set forth in steps (g), (h) and (j) until there are no further dividend digits to be utilized.

5. Method as in claim 4 wherein the addresses of the divisor multiples correspond respectively to the multipliers of the divisor.

6. Method as in claim 4 wherein the predetermined integral power is three.

7. Apparatus for dividing one number by another number comprising:

a. a plurality of addressable storage registers for storing successive integral multiples of the divisor, b. first storage means for successively storing predetermined subsets of digits derived entirely or partially from the dividend, c. comparing means for simultaneously comparing the contents of all of said addressable storage registers with the contents of said first storage means and providing an output indicative of a storage register whose contents are equal to the contents of said first storage means, or alternately the storage register containing the largest multiple less than the contents of said first storage means, d. subtracting means for subtracting the contents of the storage register whose contents are equal to the contents of the first storage means from the contents of said first storage means, or alternately subtracting the contents of the storage register containing the largest multiple less than the contents of said first storage means, from the contents of said first storage means, e. means for transferring the difference resulting from the subtraction to said first storage means to form a further partial subset, f. second storage means for storing the address of the storage register indicated by said comparing means as a quotient subset, g. control means for operating said apparatus until all digits from the dividend have been utilized, and h. means for detecting when all digits from the dividend have been utilized.

8. Apparatus as in claim 7 further comprising third storage means for storing the difference resulting from the subtraction whereby upon the completion of operation of the apparatus said difference constitutes the remainder.

9. Apparatus for performing binary divisions comprising a. a dividend register having a predetermined bit capacity, b. a divisor register having a predetermined bit capacity c. a minuend register and first transfer means for transferring data from said dividend register into said minuend register in the form of subsets of data of predetermined length, d. a plurality of addressable storage registers, e. second transfer means coupling said divisor register to said addressable storage registers, said second transfer means effecting multiplication of the divisor register contents by successive integral multipliers and storing each product in the storage register whose address corresponds to the multiplier, f. a comparator means for comparing the contents of the storage registers with the contents of the minuend register in order to determine the storage register containing a divisor multiple equal to the contents of the minuend register or alternately the storage register containing the largest divisor multiple less than the contents of the minuend register, g. a quotient register and means for transferring the address of the storage register determined by the comparator means to said quotient register, h. a subtraction means for subtracting the contents of the storage register determined by the comparator means from the contents of the minuend register, j. a difference register for storing the difference resulting from the subtraction, k. third transfer means for transferring the contents of the difference register to the minuend register and l. cycling means for providing a succession of control signals until all dividend digits have been transferred to said minuend register and the contents of the difference register are less than the contents of the divisor register.

10. Apparatus as in claim 9 wherein the bit capacity of the several registers set forth therein is integrally divisible by three.

11. Apparatus as in claim 9 wherein the number of bits in said subsets is integrally divisible by three.

12. Apparatus as in claim 9 wherein said first transfer means is coupled to said divisor register and said cycling means and controlled in accordance with the number of significant bits in said divisor register thereby to transfer data to predetermined bit positions in said minuend register.

13. Apparatus as in claim 9 wherein said second transfer means comprises a plurality of shifting means and a plurality of adding means.

14. Apparatus as in claim 9 wherein said comparator means compares simultaneously the contents of all storage registers with the contents of the minuend register.

15. Apparatus as in claim 14 wherein said comparator means generates output signals for all storage registers whose contents are equal to or less than the contents of the minuend register, and an output gate coupled to each output of the comparator means, said gate being enabled by its respective comparator means output and disabled by any output of higher rank from the comparator means so that one gate only provides an output.

16. Apparatus as in claim 15 wherein the output from said gate transfers the address of its corresponding storage register to the quotient register and the contents of its corresponding storage register to a subtrahend register.

17. Apparatus as in claim 9 wherein seven storage registers are provided having addresses 001 to 111.

* * * * *